United States Patent [19]

Newman

[11] Patent Number: 4,837,467
[45] Date of Patent: Jun. 6, 1989

[54] LINEAR MOTOR WITH ANGULARLY INDEXED MAGNETIC POLES

[75] Inventor: Wyatt S. Newman, New York, N.Y.

[73] Assignee: North American Philips Corporation, New York, N.Y.

[21] Appl. No.: 127,832

[22] Filed: Dec. 2, 1987

[51] Int. Cl.$^4$ .................................... H02K 41/00
[52] U.S. Cl. .................................... 310/12; 318/135
[58] Field of Search ................ 310/12, 13, 14; 318/135

[56] References Cited

U.S. PATENT DOCUMENTS

| 4,206,374 | 6/1980 | Goddijn | 310/49 R |
| 4,607,197 | 8/1986 | Conrad | 310/12 |

FOREIGN PATENT DOCUMENTS 0165953  9/1984  Japan ........................ 310/12

OTHER PUBLICATIONS

Goddijn, Ben. H. A., Static Performance of a Hybrid Stepping Motor with Ring Coils, Sep. 1980, p. 1.
Kuo, B. C., Proceedings 14th Annual Symposium, Incremental Motion Control Systems and Devices Jun. 1985, pp. 283–285.

Primary Examiner—Patrick R. Salce
Assistant Examiner—Judson H. Jones
Attorney, Agent, or Firm—David R. Treacy

[57] ABSTRACT

A motor for rectilinear stepping over a multiplicity of fine steps, or controlled synchronous reciprocation over a relatively long stroke. Electric coils are arranged in what is preferably an outer stator having two sections separated by an axially poled permanent magnet. Each section is formed by a series of magnetic-pole-defining members, successive members being indexed angularly by the angle between adjoining slots. A displacer has an axially extending series of magnetizable ring surfaces, separated by circumferential gaps having an axial length preferably equal to two displacer members. Operating as a stepping motor, energization of one stator coil increases magnetic flux in those stator members of a section having the same angular alignment, and attracts displacer teeth into alignment with those stator members. For the next step, another coil set is energized, to increase magnetic flux in pole faces in the axially adjoining stator members, indexed one angular position, so that the displacer moves a step equal to the axial length of the displacer member. In a preferred embodiment the displacer is made as a thin tube of alternating magnetizable and nonmagnetizable portions, with the return path formed by an inner stator having teeth aligned opposite the outer stator pole forming teeth. For the same coil current, this configuration can provide greater force while at the same time reducing the displacer mass.

16 Claims, 2 Drawing Sheets

LINEAR MOTOR WITH ANGULARLY INDEXED MAGNETIC POLES

BACKGROUND OF THE INVENTION

1. Field of the Invention

Engines or machines which produce mechanical output power, involving relative movement of two elements against a load drag or force, fall generally into two classes: translational, or linear, motors, and rotation motors. Where precise control or extremely long life are desired, electric motors are frequently preferred as the prime power source. However, because of many factors relating to the need for magnetic return paths and the cost of electromagnetic structures per unit volume, wherever a relatively long linear motion or stroke is desired starting with an electrical power source, the most common solution is to provide a rotary electric motor connected to a gear train driving a rack and pinion combination, or a rotating nut and threaded shaft combination. While multi-pole linear induction motors have been proposed as traction motors for electric railroads, these have not yet proved commercially practicable.

Many linear power sources are required to operate only over a finite distance, such as one-third to three times the principal dimension of a conventional electric motor producing the necessary amount of power. This is too long a stroke for efficient coupling of a single pole device such as a solenoid, so that in practice these applications frequently use a rotating motor which rotates the nut on a threaded shaft. However, where long life or sinusoidal linear movement of the output shaft are desired, this structure is not a very satisfactory solution.

2. Description of the Prior Art

It was recognized long ago that the basic design of a polyphase synchronous motor could be followed, to provide a linear motor having a linearly extended series of transverse pole structures. A 3-phase structure of this type is described in the paper "Commutation and Control of Step Motors" by Ish-Shalom and Manzer, Proceedings of the 14th Annual Symposium, Incremental Motion Control Systems and Devices, published by the Incremental Motion Control Systems Society in June, 1985. While published after the conception of the invention embodied in FIGS. 1-3 herein, this paper provides a useful background description of the electronic drive, and the principles underlying such a linear motor.

To achieve the high-power density associated with the use of a permanent magnet as a field magnetism source, the so-called "hybrid stepping motor" was developed and is described, for example, in a published thesis, "Static Performance of a Hybrid Stepping Motor with Ring Coils", by Ben. H. A. Goddijn, Sept. 9, 1980, published in Waalre, The Netherlands. In such a hybrid motor a field flux passes through a total motor magnetic circuit, arranged with teeth extending transversely to the direction of linear motor, the teeth on the stator having the same pitch as those on the rotor, but with certain teeth offset by 90° of one full cycle of electrical excitation in what is, effectively, a two phase electric motor. Each of the two driving coils affects half of the teeth on the armature, adding to the flux in one group of teeth to raise the flux level nearly to saturation, and bucking the field flux in the other teeth down to nearly zero. Relative movement occurs so that a tooth on the field structure is brought into alignment with the tooth which has been driven nearly to saturation.

Such a motor, as a linear structure, is clearly the linear equivalent of the rotary synchronous or stepping motor disclosed in U.S. Pat. No. 4,206,374. While it is possible to design such a structure for linear operation, the mass of the displacer or linearly moving element will be relatively high, and the manufacturing cost will also be quite high because of the large numbers of transversely extending teeth which are required. If the displacer is made shorter than the stator, to reduce the moving mass, and the coils are placed on the stator for the same reason, then a great number of coils are required to produce the necessary alternation of polarities along the length of the stator. This makes such a motor extremely expensive, and also requires that the poles be relatively far apart in the longitudinal direction. If such a motor is stepped by applying full current alternatively to one coil or the other, relative coarse stepping motion is obtained.

SUMMARY OF THE INVENTION

An object of the invention is to provide a multiple pole linear motor having all coils on the stator, with a very simple coil arrangement.

Another object of the invention is to provide a linear motor which, without resort to incremental stepping by partial excitation of each winding, provides a large number of very fine steps.

Yet another object of the invention is to simplify manufacturing, by assembling the soft magnetic portions of the motor from laminations which can be stacked on a mandrel, with coils being inserted in longitudinally extending slots.

A further object of the invention is to minimize the moving mass of a linear motor by making the displacer in the shape of a thin-walled tube.

A still further object of the invention is to provide a hybrid linear motor whose displacer is made of alternating members in a pattern which is continuous to each side of the field magnet. Then the stroke can be made so long that certain displacer members interact with stator members to one side of the magnet at one end of the stroke, and with stator members to the other side of the magnet at the other end of the stroke.

In a motor according to the invention, a displacer is arranged for linear movement parallel to an axis, and carries a plurality of axially spaced magnetizable elements having surfaces parallel to the axis, the magnetizable element surfaces being separated by spaces having an equal axial length. The stator extends parallel to the same axis, and is formed by a plurality of magnetic-pole-defining members having pole-defining surfaces parallel to the surfaces of the displacer magnetizable elements. Magnetic-pole-defining surfaces on successive stator members are axially and angularly spaced with respect to each other. An electromagnetic means selectively increases magnetic flux through the pole-defining surfaces of the stator at selected angular positions to attract the displacer to axial positions in which the magnetizable elements are aligned with pole-defining surfaces having increased flux.

In a preferred embodiment, at least a first and a second of the stator members are axially aligned, and separated by at least a third stator member, the first and second members having stator pole-defining surfaces which are angularly spaced, and the third member has pole-defining surfaces angularly indexed to a position spaced from that of the first and second surfaces, the third member being free from any pole-defining surfaces aligned with those of the first and second members. A coil means in the stator simultaneously increases magnetic flux through first and second pole-defining surfaces of the first and second members, or alternatively increases the magnetic flux through pole-defining surfaces on the third stator member.

Still more preferably, each stator member has a same given length, and has n pole-defining surfaces arranged angularly about the axis as n/2 circumferential aligned pairs of adjoining surfaces, these adjoining surfaces being spaced 360°/n relative to each other on centers. Successive stator members in a section have their pole-defining surfaces indexed 360°/n angularly in a same direction. The first and third stator members, described above, are axially separated by a fourth stator member, such that one pole defining surface of a circumferential pair on the fourth stator member is axially aligned with one pole-defining surface on the adjoining first member; while the other pole-defining surface of that pair on the fourth member is aligned axially with a pole-defining surface on the third member to the other side of the fourth member. The stator coils are arranged so that they will simultaneously increase the magnetic flux through two axially adjoining magnetic-pole-defining surfaces having the same angular alignment; and the displacer magnetizable members have surfaces having an axial length approximately equal to the length of two successive stator members, so that for a given excitation of one coil the displacer magnetizable surface will align opposite the first and fourth stator members. Excitation of a selected different coil increases the flux through the pole-defining surfaces indexed 360°/n in one direction, the surfaces being on the fourth and third members so that the displacer is attracted to step an axial distance equal to a stator member length.

Still more preferably, in this embodiment the motor is formed as a hybrid motor having two stator sections separated by an axially poled permanent magnet. The displacer is formed as a thin hollow tube having equal length rings made of magnetizable and nonmagnetizable material alternating along the length of the displacer. An inner stator, coaxial with the outer stator has inner stator members having magnetic-pole-defining surfaces axially and angularly aligned opposite those of the outer stator. The inner stator is formed as two sections connected by a magnetic return path; or alternatively interconnected by a permanent magnet poled in the opposite axial direction, so as to increase the field flux passing radially inward from the outer to inner stators of one section, and radially outward from the inner to outer stators of the other section.

In a different embodiment according to the invention, the displacer is readily manufactured from an axially extending cylindrical body formed of a magnetizable material, the displacer magnefizable elements being annular rings about that body. In a further preferred embodiment, the displacer elements and magnetizable surfaces are formed on that body.

DESCRIPTION OF THE PREFERRED EMBODIMENTS

Figure 1:
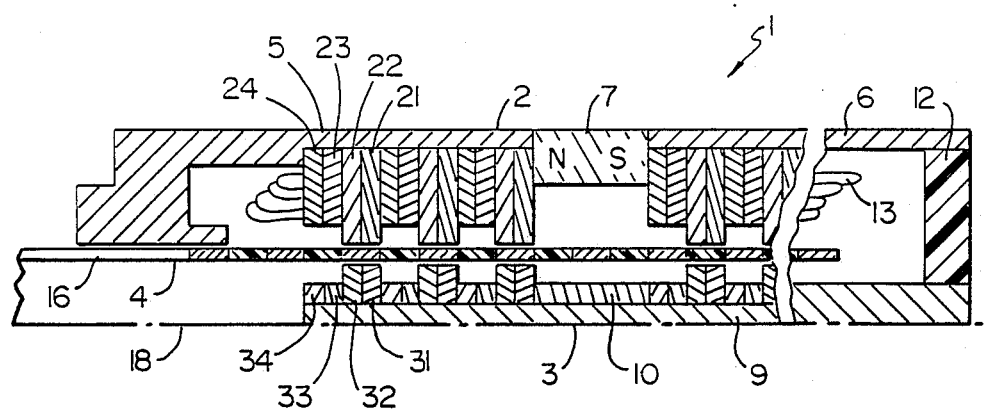
FIG. 1 is a longitudinal section of a hybrid motor according to the invention, having a tubular displacer and an inner stator.
Figure 2:
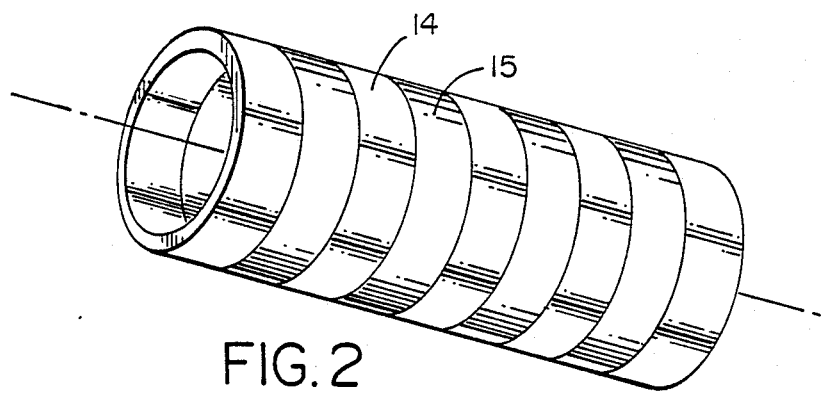
FIG. 2 is a perspective view of the displacer of FIG. 1, only the alternating magnetic and nonmagnetic rings being shown.

The embodiments of FIGS. 1-3 have a unique, simple lightweight displacer which has complete circular symmetry. This displacer is translated in the axial direction in the space lying between an inner gap-defining surface of an outer stator, and an outer gap-defining surface of an inner stator. The outer stator and inner stator each comprise pole-defining members formed by a plurality of axially spaced angular-pole-shaping members, successive members being indexed angularly and spaced axially at a given pitch distance, equal to the axial thickness of an individual member which is preferably a single lamination.

Referring to FIG. 1, a linear motor 1 has three principal parts: an outer stator 2 containing a stack of members or laminations to be described below, and windings (for clarity, only the end turns are shown in this view); an inner stator 3 having a correspondingly indexed set of members or laminations to be described below; and a displacer 4 which is free to move axially between the inner and outer stators.

The outer stator 2 is assembled within front and rear housing parts 5 and 6 which are separated by a field magnet 7, which is an axially magnetized ring magnet. Front and rear outer lamination stacks fit snugly within the housing parts 5 and 6, and abut the respective pole faces of the magnet 7.

The inner stator 3 is made up of two stacks of laminations mounted on an inner stator mandrel 9, and spaced by a center return path ring 10 which is aligned axially with the field magnet 7. The inner stator 3 is held in position with respect to the outer stator 2 by a stabilized, filled resin block 12, through which electrical connections may be made to the outer stator coils.

As shown more clearly in FIG. 2, the displacer is formed primarily of an alternating series of magnetic rings 14 and nonmagnetic rings 15 each of which is quite thin radially and extends axially a length equal to the thickness of two successive stator members or laminations. A shaft extension 16 extends through the front of the motor, to enable connection to a load which is to be driven by the motor.

To minimize weight and electrical losses, the nonmagnetic rings 15 may be made of a stable, filled synthetic resin material; or they may be made from a nonmagnetic, moderately high resistance metal or a ceramic material which can be machined to shape, and bonded readily to the magnetic rings 14.

The lamination arrangement for the motor 1 is shown more clearly by comparing FIG. 1 with FIGS. 3a-3f. FIGS. 3a, 3b, 3c and 3f show four successive outer stator angular-pole-shaping members, which are indexed 45° counterclockwise in sequence. Each of these pole-shaping members is formed preferably as a single lamination, typically punched from a thin strip of a high permeability magnetic metal such as 2V Permendur, an alloy of 49% iron, 49% cobalt and 2% vanadium. Each member or lamination has four inwardly extending long teeth 25, each terminating in a pole face 26 subtending an angle somewhat less than 40° about the axis 18. The long teeth 25 are arranged as two diametrically opposed pairs of adjacent teeth which are spaced 45° apart on centers. Four short teeth 27, having a tooth width the same as that of the long teeth, are arranged in pairs spaced 45° on centers between the long teeth 25, thus forming a symmetrical structure of alternating two long teeth, two short teeth, two long teeth, and two short teeth around the periphery of a circular cylindrical gap-forming surface 28 shown, for clarity, in FIG. 3c as dashed lines. Because each of the teeth is less than 45° in width, eight equally spaced slot spaces 29 are formed between the respective adjacent teeth as diametrically opposed slot pairs 29a, 29b, 29d and 29e.

The inner stator 3 is made similarly of a series of laminations 31-34, sequential laminations being shown in Figs. 3a, 3b, 3c, and 3f. Each inner angular-pole-shaping member or lamination has two long teeth 35 which subtend an angle of somewhat less than 90° and are arranged directly opposite the respective pairs of pole faces 26 formed on the adjoining long teeth 25 of the outer stator member 21-24. The long teeth 35 of each inner stator member lie along a circular cylindrical gap-forming surface 38, shown in dashed lines in FIG. 3c. Between the diametrically opposed teeth 35 on the inner stator there are symmetrical recessed portions 37. The recessed portions 37 are spaced inwardly from the gap forming surface 38, and the short teeth 27 have their inner ends similarly spaced from the gap forming surface 28, a sufficient distance that they form high reluctance paths to the gap-forming surface, in comparison to the paths through the long teeth 25 and the inner stator teeth 35.

In the position shown in FIG. 1, one of the displacer magnetic rings 14 is aligned axially with adjoining outer members 21, 22 and adjoining inner members 31, 32. Thus, by comparison with FIGS. 3a and 3b, it will be clear that the magnetic ring lies in the stator air gap formed between the two pole faces 26 and the face of an inner stator long tooth 35. The magnetic ring is preferably made to have a radial thickness only slightly smaller than the radial gap between the teeth 35 and 25, so that the total air gap, from a long tooth 25 to the axially aligned magnetic ring 14, and from the ring to the inner stator tooth 35 is very small in comparison with the gap between the short teeth 27 and the magnetic ring 14, or the recessed portion 37 and the ring 14.

Figure 3A:
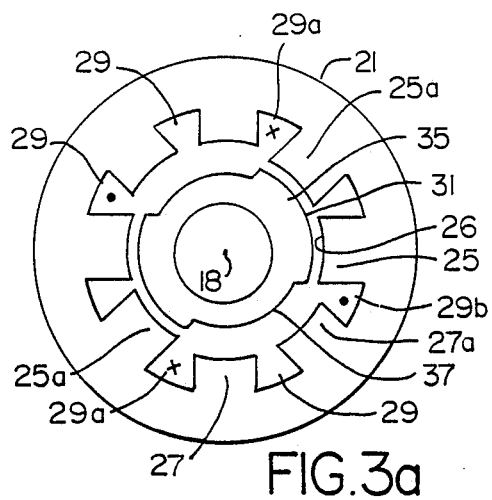
FIGS. 3a-3f are diagrammatic views of axially aligned outer and inner stator members, showing the affects of different coil excitation.
Figure 3D:
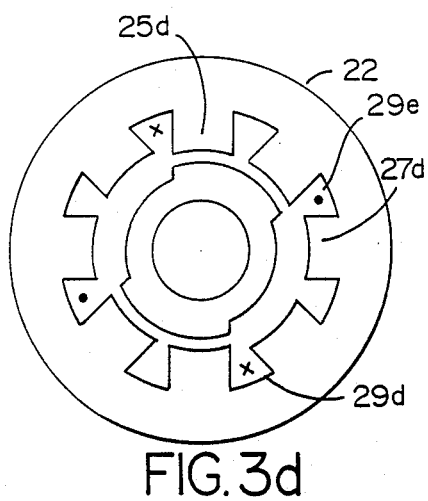
Figure 3B:
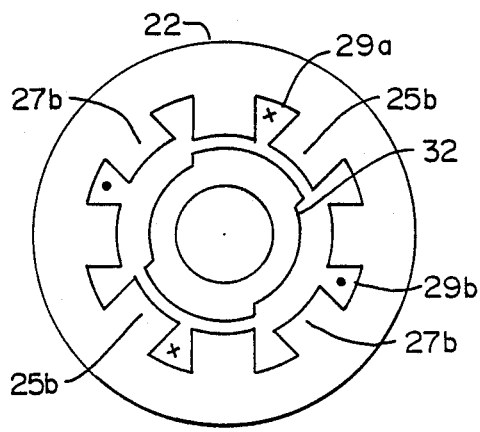
Figure 3E:
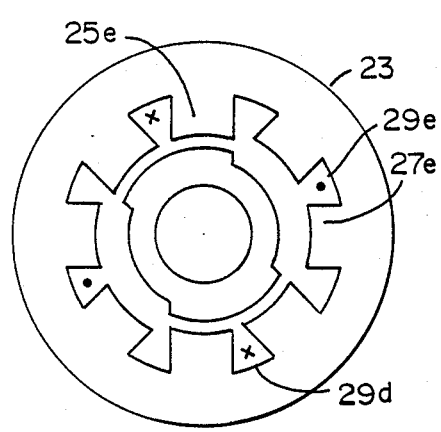
Figure 3C:
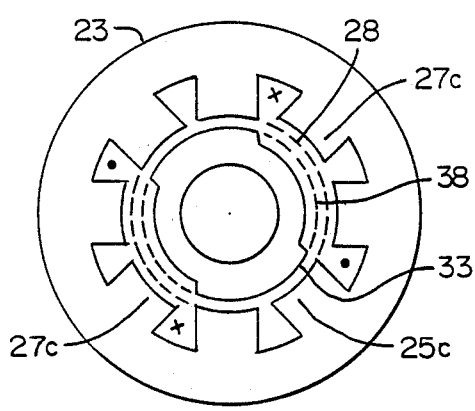

The coils 13 are preferably arranged as two coil sets, one of which provides a current distribution shown conventionally as the point and tail of an arrow in the slots 29a and 29b of FIGS. 3a–3c, to attract the displacer toward one of a first set of positions; and with reverse polarity (the opposite direction of current) to attract the displacer toward one of another set of positions. The second coil set produces the current distribution shown similarly in slots 29d and 29e in FIGS. 3d–3f, or the opposite current direction, to attract the displacer towards respective other sets of positions.

From FIG. 1 it will be seen that the field magnet 7 tends to produce field flux flowing from the front outer stator members, inwardly across the air gap to the front inner stator members, rearwardly through the center return path ring and mandrel of the inner stator, and then outwardly from the rear inner stator members, across the rear air gap, to the rear outer stator members. The member shown in FIG. 3a is a front member, so that will be clear that the current pattern shown will produce a flux through the teeth 25a which is additive to that caused by the field magnet 7, while the same current distribution tends to reduce or buck the field flux through the short teeth 27a that are 90° away. Similarly, as shown in FIG. 3b, this same current distribution will provide additive flux in long teeth 25b and reduced flux in short teeth 27b. Thus, each of the facing members 21, 31 and 22, 32 exerts a strong magnetic pull to hold the magnetic ring 14 centered axially with respect to these two adjoining stator members. At the same time, this current pattern will produce very little flux through the short teeth 27c of outer stator member 23, shown in FIG. 3c because of the long gap caused by the recessing of the face of the tooth 27c from the outer gap-defining surface 28.

Figure 3F:
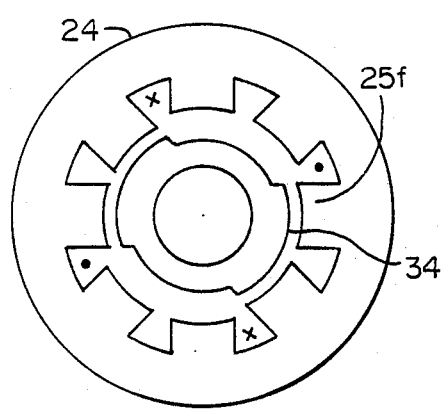

FIGS. 3d, 3e and 3f show the members of FIGS. 3b and 3c, and the fourth member pair respectively, with the current distribution 90° later in time for one electrical cycle, if the motor is being operated as a linear synchronous motor, or one displacer step to the left, as viewed in FIG. 1, if the motor is being operated as a stepping motor. Clearly the current distribution has a pattern just like that of FIGS. 3a–3c, except rotated 45° counterclockwise. As a result, flux is additive in the long teeth 25d of outer stator member 22, and 25e in stator member 23; and is reduced or bucked in the short teeth 27d, 27e of members 22 and 23, and the long teeth 25f of outer stator member 24. This causes the displacer to move to the left one axial pitch distance, equal to the thickness of one stator member, so that the magnetic member 14 is now aligned axially between the members 22, 23 and 32, 33.

In the hybrid motor shown in FIG. 1, it will be clear that flux passes radially inward from the front outer stator section to the front inner stator section, and radially outward from the rear stator inner section to the rear outer section. Because a given stator coil tends to increase flux inwardly in all those teeth which it surrounds, a coil current distribution shown in FIGS. 3a–3c increases the flux through the long teeth shown in section in the front stator section of FIG. 1; while it bucks the field flux through those stator teeth having the same angular position in the rear stator section. Thus this same current distribution increases the flux flowing outwardly through the long teeth of the stator members 23 and 24 of the rear section, which are aligned axially with the magnetizable elements 14 then present between the rear inner and outer stator sections.

The displacer can also be positioned or stepped distances less than one axial pitch by energizing both coil sets simultaneously, either with the same current in each coil or with differing magnitudes.

Single Stator Embodiments

Figure 4:
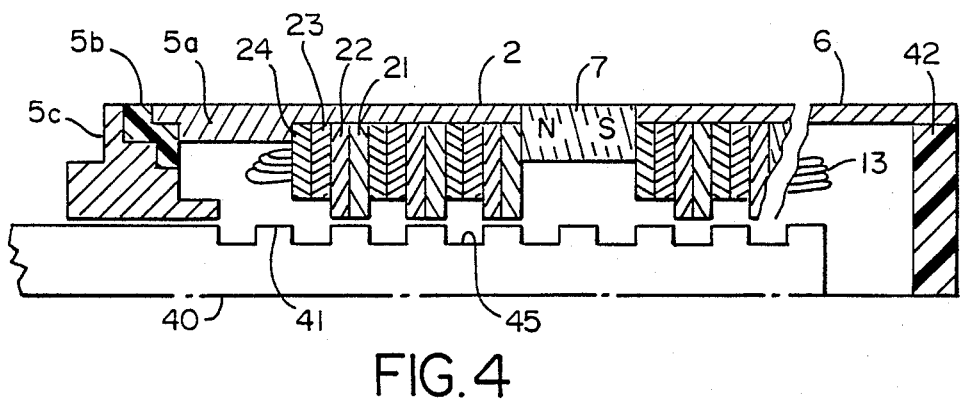
FIG. 4 is a longitudinal section of a hybrid motor according to the invention having a solid displacer with integral return path.

The embodiment shown in section in FIG. 4 differs from that described above, in that the return path for magnetic flux forms part of the displacer, or armature, so that no inner stator is required; and in that the displacer can be formed as one unitary body because non-magnetic spacers are not required.

The stator 2 shown in FIG. 4 may be identical to that of FIG. 1, with only the resin block 12 of FIG. 1 being replaced by a disc 42 through which electrical connections may be made to the stator coils and a flux-blocking non-magnetic spacer 5b fitted between the housing part 5a and a mounting and bearing part 5c.

The displacer 40 is made of a single block of magnetic iron, having alternating cylindrical pole surfaces 41 and recesses 45, equally spaced with a pole and a recess length each being equal to the length of two successive stator pole-shaping members. Structurally, this displacer is thus like that shown in FIG. 2 except that the entire interior of the displacer is filled with magnetic material. Thus the stepping sequence of the embodiment of FIG. 4 is identical to that of FIG. 1.

Compared with the embodiment of FIG. 1, the single-stator embodiment has the disadvantage that the displacer has a far greater mass. The developed magnetic axial force may also be less than that of the FIG. 1 embodiment, if the stator 2 dimensions are the same, except that it may be feasible to operate with a smaller radial clearance in the gap between displacer and stator because of simplified fabrication and greater rigidity of the displacer.

For some applications, the motor of FIG. 4 may be made shorter than that of FIG. 1, while producing the same stroke, because the rear of the motor can conveniently be made essentially as a mirror image of the front, with a bore through which the displacer may travel axially.

Where structural length is extremely critical, the recesses 45 of the displacer may be filled with a nonmagnetic material, preferably one which is a poor electrical conductor, so that the displacer has a smooth cylindrical surface. With this variation special bearings at the two ends of the motor may be eliminated, and the displacer may be guided radially, in whole or in part, by the cylindrical faces formed in the stator on the pole-shaping members.

Other Embodiments

The angular-pole-defining members may each comprise a number of thin laminations aligned axially, the laminations forming one member having identical angular alignment and those forming the next member all being indexed the same amount with respect to the first member. Where relatively high stepping frequencies, or operating frequencies for synchronous operation, are desired such a structure greatly reduces eddy current losses.

Those of ordinary skill in the art will recognize that it is not necessary to have similar structures to each side of the magnet 7. In a variation of the embodiment of FIG. 1, which reduces the axial length of the motor for a given stroke, the stator-pole-defining members may all be located to one side axially of the magnet, while a minimum-length return path connects the inner and outer stators to the other side. It is so clear that it is not necessary that the magnet be configured as shown, or located solely in the outer stator. Further, the field magnet need not be a permanent magnet. The field flux can be provided by a field coil cooperating with the magnetic structure, such as a ring coil surrounding a magnetic material, or inside a magnetic sleeve such as the housing 6. Either a permanent magnet or an electromagnet can be part of the inner stator, for example replacing return path ring 10.

Other variations also include placing windings in slots in the inner stator, in addition to or in place of slotted laminations for the outer stator. To avoid imperfect radial alignment of the inner stator with respect to the outer stator, it is possible to provide a series of axial slots in the shaft extension 16 of the FIG. 1 displacer, so that the legs of a spider may pass through these slots to center the front end of the inner stator very precisely with respect to the housing part 5 of the outer stator 2.

It will be clear that many other winding and/or magnetic pole configurations can be utilized in accordance with the basic concept of the invention, as described in the appended claims. For example, with the same lamination shape, different coil distributions can involve conductors from different coils sharing the same slot. Indexing of successive pole-defining members need not advance continually in one direction, nor is it necessary that two successive pole-defining members have long pole-defining portions simultaneously experiencing additive magnetization; in that circumstance the length of the displacer magnetic ring will be appropriately selected. Of course, it is not necessary that the magnetic and nonmagnetic rings, or the alternating cylindrical pole structures 41 and recesses 45, each have the same axial length. Where space constraints are especially severe respecting motor length, it would also be possible to have two concentric displacer sections moving in gaps between an inner, an intermediate and an outer stator section. The field magnet might then be radially poled and could be part of the intermediate stator or be in the radial return path at the end of the motor.

What is claimed:

1. A linear motor comprising:
   a displacer arranged for movement parallel to an axis, and carrying a plurality of axially spaced magnetizable elements having surfaces parallel to said axis, and
   a stator extending parallel to said axis, comprising a plurality of magnetic-pole-defining members having pole-defining surfaces parallel to said displacer surfaces, successive magnetic-pole-defining surfaces being axially and angularly spaced with respect to each other; and means for selectively increasing magnetic flux through angularly selected surfaces of said stator to attract said displacer to selected axial positions with respect to said stator.

2. A motor as claimed in claim 1, characterized in that said displacer magnetizable element surfaces are circumferential surfaces coaxial with said axis, and
   said displacer comprises an axially extending body formed of a magnetizable material interconnecting said magnetizable elements.

3. A motor as claimed in claim 2, characterized in that said displacer magnetizable surfaces are formed on said body.

4. A motor as claimed in claim 1, characterized in that at least a first and a second of said angularly spaced stator surfaces are axially aligned and are formed on respective first and second stator magnetic-pole-defining members, said first and second members being separated by at least a third stator member having third pole-defining surfaces angularly indexed to an angular position spaced from that of said first and second surfaces, said third member being free from pole-defining surfaces in axial alignment with the pole-defining surfaces on said first and second members, and
   said stator comprises coil means for simultaneously increasing magnetic flux through said first and second surfaces, and alternatively increasing magnetic flux through said third surfaces.

5. A motor as claimed in claim 4, characterized in that each stator member has a same given length, and has n pole-defining surfaces arranged angularly about said axis as n/2 circumferentially aligned pairs of angularly adjoining surfaces, said angularly adjoining surfaces being spaced 360°/n relative to each other on centers,
   successive stator members have pole-defining surfaces indexed 360°/n angularly in a same given direction, said third stator member having pole-defining surfaces axially aligned with spaces between pole-defining surfaces of said first member; and said first and third members being separated axially by a fourth stator member, said coil means simultaneously increases magnetic flux through pairs of axially aligned magnetic-pole-defining surfaces on axially adjoining members, and said displacer magnetizable surfaces have an axial length approximately equal to the axial length of two stator members, whereby one condition of excitation of said coil means increases magnetic flux through a first axially aligned pair of stator surfaces on said first and fourth stator members, and attracts one displacer magnetizable surface into axial alignment with said first and fourth stator members; and another condition of excitation increases flux through a second axially aligned pair of stator surfaces on said fourth and third members, indexed 360°/n from said first pair of axially aligned surfaces, and attracts said one displacer surface into alignment with said fourth and third stator members.

6. A motor as claimed in claim 5, characterized in that said displacer magnetizable surfaces are formed on said body.

7. A motor as claimed in claim 2, characterized in that said displacer magnetizable surfaces are formed on said body.

8. A motor as claimed in claim 1, characterized in that said displacer magnetizable surfaces are formed on said body.

9. A linear motor comprising:
an elongated stator having a first gap-defining surface extending in a relative movement direction parallel to an axis, said stator comprising a plurality of axially spaced magnetic-pole-defining members having pole faces lying at least substantially in said surface, and coil means for selectively magnetizing said members,
a displacer having a second gap-defining surface facing said first surface, parallel to and coaxial with said axis, and
means for mounting said displacer with respect to said stator to permit displacer movement in said direction,
characterized in that each magnetic-pole-defining member of said stator is an angular-pole-shaping member having a plurality of teeth at angularly-spaced locations around the periphery of said first gap-defining surface, said teeth being separated by spaces and constituting poles having pole faces providing a low reluctance magnetic path to said first surface,
said angular-pole-shaping members are arranged as a coaxial stator stack, said teeth being arranged in a repeating sequence of relative angular positions of said teeth, and said stack having a plurality of aligned winding slots formed by said spaces and defined by said teeth,
said coil means includes at least first and second coils, each coil having a portion disposed in a respective slot,
said displacer comprises a displacer stack having a plurality of substantially identical magnetic members aligned perpendicularly to said direction, said displacer magnetic members having surfaces lying substantially along said second gap-defining surface, a space between said first and second gap defining surfaces being a first air gap, and
said members of one of said stacks are spaced at a given axial pitch and the members of the other of said stacks are spaced axially at a pitch at least twice said given pitch; said stator and displacer are so arranged that, responsive to a given excitation of one of said coils only, said displacer is attracted to a first of a repeating series of stable positions with respect to said stator, a first of said displacer magnetic members being aligned with teeth of one of said magnetic-pole-forming members at a first angular location; and responsive to a second excitation of another of said coils only, said displacer is attracted to a second position, adjoining said first position, at which second position one of said displacer members is attracted to teeth at an angular location spaced from said first angular location.

10. A motor as claimed in claim 9, characterized in that said stator angular-pole-shaping members are identical members, arranged with each successive member rotated a given angular distance with respect to the preceding member, said distance being an integral multiple of the angular spacing between said slots.

11. A motor as claimed in claim 10, characterized in that said motor is a hybrid motor, comprising:
first and second stator sections, axially spaced, and
field magnet means for providing a field flux which crosses said air gap from said first stator section to said displacer in a given flux direction, and crosses said air gap from said second stator section to said displacer in a direction opposite said given flux direction.

12. A motor as claimed in claim 11, characterized in that each stator angular-pole-shaping member has four said teeth having pole faces, two said slots being formed between adjoining said teeth having pole faces along said gap-defining surface, said given angular distance being equal to said angular spacing between slots.

13. A linear motor comprising:
an elongated stator having a first gap-defining surface extending in a relative movement direction parallel to an axis, said stator comprising a plurality of axially spaced magnetic-pole-defining members having pole faces lying at least substantially in said surface, and coil means for selectively magnetizing said members,
a displacer having a second gap-defining surface facing said first surface, parallel to and coaxial with said axis, and
means for mounting said displacer with respect to said stator to permit displacer movement in said direction,
characterized in that said stator comprises an inner stator portion and an outer stator portion, and means for mounting said stator portions fixedly with respect to each other,
one of said stator portions comprises said magnetic-pole-defining stator members, each said magnetic-pole-defining member being an angular-pole-shaping member having a given axial length generally equal to the axial length of the displacer magnetic members; and around the periphery of said first gap-defining surface, said angular-pole-shaping member has a plurality of equiangularly spaced teeth, said teeth being separated by spaces and constituting poles having pole faces having a low reluctance magnetic path to said first surface, said angular-pole-shaping members are arranged as a coaxial stack having a plurality of generally axially extending winding slots, the successive pole-shaping members of the stack being arranged in a repeating angular sequence of relative angular positions of the low reluctance path teeth, said coil means includes at least first and second coils, each coil having a portion disposed in a respective slot, said other stator portion comprises a corresponding plurality of angular-pole-shaping members having a corresponding plurality of teeth at angularly-spaced locations around the periphery of a third gap-defining surface, said teeth of the members of said other portion being separated by spaces and constituting poles having pole faces providing a low reluctance magnetic path to said third surface, said members of said second stator portion being arranged as a coaxial stator stack with the teeth thereof constituting poles having pole faces being arranged in axial and angular alignment with, and facing, corresponding teeth of the members of said first portion, said displacer comprises a displacer stack having a plurality of substantially identical rotation-symmetrical magnetic members alternating with substantially identical nonmagnetic members, coaxially with said axis, at least a plurality of said magnetic members being disposed in axial positions between said inner and outer stator portions, and said angular-pole-shaping members are so arranged that, responsive to a given excitation of one of said coils, said displacer is attracted to a first of a repeating series of stable positions with respect to said stator; and responsive to a second excitation of another of said coils, said displacer is attracted to a second position, adjoining said first position and spaced therefrom a distance equal to said axial length.

14. A motor as claimed in claim 13, characterized in that said stator angular-pole-shaping members are identical members, arranged with successive members rotated a given angular distance with respect to the preceding member, said distance being an integral multiple of the angular spacing between said slots.

15. A motor as claimed in claim 14, characterized in that said motor is a hybrid motor, comprising;
first and second stator sections, axially spaced, and
field magnet means for providing a field flux which crosses said air gap from said first stator section to said displacer in a given flux direction, and crosses said air gap from said second stator section to said displacer in a direction opposite said given flux direction.

16. A motor as claimed in claim 15, characterized in that each stator angular-pole-shaping member has four said teeth having pole faces, two said slots being formed between adjoining said teeth having pole faces along said gap-defining surface, said given angular distance being equal to said angular spacing between slots.

* * * * *